United States Patent
Prenn et al.

(10) Patent No.: US 6,734,984 B2
(45) Date of Patent: May 11, 2004

(54) SYSTEM HAVING AN ARITHMETIC-LOGIC CIRCUIT FOR DETERMINING THE MAXIMUM OR MINIMUM OF A PLURALITY OF CODES

(75) Inventors: M. Therese Prenn, Star, ID (US); Chang H. Lee, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 309 days.

(21) Appl. No.: 09/960,136

(22) Filed: Sep. 21, 2001

(65) Prior Publication Data

US 2004/0015853 A1 Jan. 22, 2004

Related U.S. Application Data

(62) Division of application No. 09/156,922, filed on Sep. 18, 1998.

(51) Int. Cl.[7] .......................... G06F 15/00; G06F 13/24
(52) U.S. Cl. ................... 358/1.12; 358/1.12; 358/1.17; 710/260; 710/263
(58) Field of Search .............................. 358/1.12–1.15, 358/1.17, 437; 395/1.13; 710/260–263, 15, 46–50

(56) References Cited

U.S. PATENT DOCUMENTS

| | | | |
|---|---|---|---|
| 3,755,787 A | * | 8/1973 | Henegar |
| 4,734,876 A | | 3/1988 | Williams |
| 4,807,117 A | | 2/1989 | Itoku et al. |
| 5,163,152 A | | 11/1992 | Okamoto |
| 5,400,007 A | | 3/1995 | McClure |
| 5,659,759 A | | 8/1997 | Yamada |
| 5,721,809 A | | 2/1998 | Park |
| 5,745,662 A | * | 4/1998 | Nagata et al. ............... 395/113 |
| 5,983,308 A | * | 11/1999 | Kerstein ...................... 710/263 |
| 6,070,218 A | * | 5/2000 | Giles et al. .................. 710/260 |

* cited by examiner

Primary Examiner—Kimberly Williams
Assistant Examiner—Saeid Ebrahimi

(57) ABSTRACT

A computer system or peripheral device includes an arithmetic-logic circuit that provides, for example, in binary parallel format a maximum code from a set of input codes, each input code in binary parallel format. The circuit has minimal propagation delay owing to its expandable architecture which includes: an array of product term generators, a summary term generator, and a selection circuit. Each product term generator primarily includes one AND gate per product term having inputs that combine bits of an input code, the product terms being organized in sets. The summary term generator includes one OR gate for each summary term. The selection circuit includes a multiplexer for each set having data inputs responsive to summary term signals and control inputs responsive to summary term signals of higher significance than the highest summary term on a data input of the multiplexer. In illustrated embodiments, a printer includes an integrated circuit processor of the present invention. The integrated circuit has an interrupt controller having an arithmetic-logic circuit as described above. Other embodiments include shared resource arbitration logic including bus arbitration, sorting circuits, and sensor assay circuits.

25 Claims, 8 Drawing Sheets

SYSTEM HAVING AN ARITHMETIC-LOGIC CIRCUIT FOR DETERMINING THE MAXIMUM OR MINIMUM OF A PLURALITY OF CODES

This is a divisional of copending application Ser. No. 09/156,922 filed on Sep. 18, 1998, which is hereby incorporated by reference herein.

FIELD OF THE INVENTION

The present invention relates to a computer system, peripheral device, or component having a circuit for determining the maximum or minimum of a plurality of codes.

BACKGROUND OF THE INVENTION

As an introduction to problems solved by the present invention, consider the conventional interrupt controller of a computer system. An interrupt controller is used with a processor or bus manager for determining which of several competing requests should be granted, based on a hierarchy of priority levels. For example, a conventional printer includes a processor for device control and data communications functions. This processor must service perhaps a dozen input/output circuits (called interrupt sources), each having an independent function (e.g. out of paper indicator, input data buffer full, scan line format complete, etc.). Although the processor could perform stored program instructions to determine in what order to service these numerous requests, these functions are more economically and efficiently performed by a dedicated circuit conventionally called an interrupt controller.

An interrupt controller generally receives an interrupt signal on a separate line from each interrupt source. Generally, when an interrupt signal is received, the interrupt controller signals the processor and the processor performs an interrupt acknowledge procedure to transfer control from the currently running task to the task that will service the interrupt. Transfer of processor execution control to a new address is conventionally accomplished via a table of addresses (called a vector table) indexed by an interrupt identifier. During the interrupt acknowledge procedure, the interrupt controller passes to the processor the interrupt identifier associated with the interrupt request signal.

In a system having numerous interrupt sources, various interrupt sources may require servicing ahead of other interrupt sources. And, the processor may require uninterrupted processing time. In such a system multiple interrupt requests may be asserted during a time when the processor is unavailable to service an interrupt. The interrupt controller, during such a time, maintains a request to the processor for interrupt servicing. When the processor becomes available and so indicates to the interrupt controller by beginning the interrupt acknowledgement procedure, the interrupt controller determines the currently pending highest priority interrupt and responds with an interrupt identifier for the appropriate interrupt source.

In a system where the program executed by the processor assigns interrupt identifiers to various input/output functions (either at system initialization or from time to time for sophisticated control functions), the value of an interrupt identifier may conveniently indicate by its binary magnitude the priority of the associated interrupt source over other interrupt sources. The interrupt identifier passed to the processor in an interrupt acknowledge procedure may be the interrupt identifier having the maximum binary value.

When a design having a large number of interrupt sources is to be expanded to service additional interrupt sources by a single processor in a conventional computer system design, the conventional interrupt controller design in its expanded form cannot avoid the undesirable side effects of increased circuit complexity and increased propagation delay. To be expandable, such a system design often propagates one or more carry signals from stage to stage in either an asynchronous or clocked manner. An expanded conventional circuit for accommodating additional interrupt sources has a considerably increased number of logic gates. Signal propagation through these additional gates also increases interrupt controller propagation delay. In other applications, the possibility of increasing propagation delay and/or circuit complexity cannot be accommodated within economic constraints of the planned product.

The problem of selecting the highest priority interrupt to service as discussed above with respect to input/output devices is similar in some respects to problems in other computer system components. For example, a multipurpose data communication bus shared by several devices is conventionally designed with a bus controller that permits exclusive use of the bus to a highest priority device. Priorities are designated conventionally by codes having a magnitude; the device associated with the code having the highest magnitude operates as the highest priority device. Generally any computer system resource (e.g. a processor, a bus, an input/output circuit, etc.) may be shared using a conventional circuit for arbitration. When presented with multiple pending requests to share the resource, such a circuit determines the highest priority request by determining the code having the highest magnitude. As another example, dedicated sorting logic for selecting data words in a sequence may also use a conventional circuit for selecting a "next" data word based on determining the highest magnitude data word not previously selected. Excessive circuit complexity and excessive propagation delay in these and related applications raise severe constraints on the practical design and economic marketing of a wide range of computer systems and products controlled by digital logic circuits.

Markets continue to demand sophisticated computer systems and computer operated products. Because sophisticated products increasingly operate with a large number of input/output circuits, and because the control of input/output circuits by interrupt servicing is more efficient than control using polling techniques, there is a continuing need for an interrupt controller design that is expandable with less added complexity and that operates with less added propagation delay. Similarly, in applications for selecting a device or a data word according to a code (or the data word itself) having the highest magnitude, as discussed above, there is a continuing need for a circuit design that is expandable with less added complexity and that operates with less added propagation delay.

SUMMARY OF THE INVENTION

An arithmetic-logic circuit according to aspects of the present invention receives a plurality of input codes and determines an output code. Each code has a respective magnitude and is conveyed in parallel by a plurality of respective (input or output) code signals. The circuit includes several product term generators (one for each respective plurality of input code signals), a summary term generator, and a selection circuit. Each product term generator provides a respective plurality of product term signals. Each product term signal is indicative of an AND combination of respective input code signals. The summary term generator provides a plurality of summary term signals in parallel. Each summary term signal is indicative of an OR combination of a corresponding product term signal from each product term generator. The selection circuit provides the plurality of output code signals according to an extreme of the respective magnitudes of the input codes. At least one output code signal is indicative of an AND combination of a multiplicity of summary term signals of the plurality of summary term signals.

When such a circuit is used in an interrupt controller, as described above, expansion of the design to accommodate an additional interrupt source can be accomplished with little added complexity and no added propagation delay. For example, when the number of bits in the input code is sufficient to accommodate the additional interrupt source, then the additional input code is received by an additional product term generator that generates additional product terms and the summary term generator is modified to merely add an additional gate input for each additional product term. Propagation delay of the interrupt controller is substantially unaffected by these modifications.

When the number of input code bits must be incremented to accommodate an additional interrupt source, then the modifications described above are supplemented with the following modification. Each product generator is modified by adding a few gates and gate inputs for the additional input code bit. The summary term generator is modified by adding one gate. And, the selection circuit is modified to add a multiplexer. Propagation delay is affected only by the addition of the multiplexer. The increase in circuit complexity is quite modest compared to corresponding increased complexity of conventional circuit designs.

A printer, according to various embodiments of the present invention includes a print engine, and a printer controller. The print engine prints data on media and in operation provides a plurality of pending interrupt request signals. The printer controller includes a processor for providing data to the print engine in accordance with an output code received in parallel by a plurality of output code signals and an interrupt controller. The interrupt controller includes both a register and a product term generator for each pending interrupt request signal, and includes a summary term generator and selection circuit. The register stores an input code and provides a respective multiplicity of input code signals in parallel to convey the respective input code. Each respective product term generator is coupled to the respective register and provides a respective plurality of product term signals. Each product term signal is indicative of an AND combination of respective input code signals. The summary term generator provides a plurality of summary term signals in parallel, each summary term signal indicative of an OR combination of a corresponding product term signal from each product term generator. The selection circuit provides the output code signals to convey an output code that is an extreme (e.g. a maximum or minimum) of the input codes associated with the pending interrupt request signals.

A computer system, according to various embodiments of the present invention includes a shared resource, an arbitration circuit, and a plurality of devices that compete to cooperate with the shared resource. Each device provides a respective device signal. The arbitration circuit includes a respective input code register that stores an input code having a magnitude associated with a device of the plurality of devices. Each register provides, in response to the corresponding device signal, a respective plurality of input code signals in accordance with the respective stored input code. The arithmetic-logic circuit includes product term generators, a summary term generator, and a selection circuit as discussed above. The selection circuit provides the plurality of output code signals according to an extreme of the respective magnitudes of the input codes. At least one output code signal is indicative of an AND combination of a multiplicity of summary term signals of the plurality of summary term signals. The resource includes a controller that receives the output code signals and controls cooperation of the resource with the device associated with the input code corresponding to the extreme of the respective magnitudes of the input codes.

A method according to various embodiments of the present invention determines an output code having a magnitude corresponding to an extreme magnitude of a plurality of input codes, each input code having a magnitude. Each input code (and the output code) is conveyed by a respective plurality of input (or output) code signals. The method, in one embodiment includes the steps of (a) storing the plurality of input codes in a memory; (b) providing a multiplicity of input codes from the memory to an arithmetic-logic circuit of the type discussed above; and (c) obtaining the output code from the arithmetic-logic circuit by receiving the plurality of output code signals.

The beneficial results discussed above with reference to an interrupt controller including low circuit complexity, low propagation delay, less added circuit complexity, and less added propagation delay, may be obtained in a wide variety of applications according to the present invention, for example, a bus controller, a resource sharing arbitration circuit, and a sorting circuit. In such applications overall system performance improvements and greater system responsiveness may be evident to the system user. Use of systems and methods of the present invention may result in economic feasibility of a wide range of computer systems, computer operated products, and specialized logic circuits heretofore unavailable to the market.

BRIEF DESCRIPTION OF THE DRAWING

Preferred exemplary embodiments of the present invention are described below with reference to the drawing in which a feature that appears in several figures is accompanied by the same reference number in each figure, and in which.

DETAILED DESCRIPTION OF THE PREFERRED EMBODIMENT

The following description of how to make and use various embodiments of the present invention begins with a printer as an example of a device whose operation includes the determination of the maximum or minimum of a plurality of codes. In these and similar electronic devices, information processing often involves the comparison of information from several sources or from several points in time from the same source. Information to be compared may be present as a set of codes (or items of information) where each code expresses a numeric (e.g. binary) value. Often, processing is to be directed according to the code having an extreme value, such as a maximum or a minimum value of all codes in a set. For highest processing speed, the determination of the code that has the extreme value, according to various aspects of the present invention, is primarily accomplished by an arithmetic-logic circuit (also generally called an item value selector).

An item value selector according to aspects of the present invention includes any binary arithmetic-logic circuit that provides at its output, a value determined to be the extreme value of the set of values presented at its input. Preferably, each member of the set of input values is provided to the arithmetic-logic circuit as a group of parallel binary signals. The parallel combination of signals (e.g. at an instant of time) in such a group is called an input code. Similarly, the output value is provided by the arithmetic-logic circuit as a group of parallel binary signals. The parallel combination of signals (e.g. at an instant of time) in such a group is called an output code.

Variations of an item value selector employ serial to parallel conversion of an input signal (or signals) and parallel to serial conversion to produce a serial output signal. Since serial to parallel and parallel to serial techniques are well known and easily applied to the circuits discussed below, the discussion below centers on variations of an item value selector primarily having parallel signal inputs and a parallel signal output.

As discussed above, an item value selector finds application in many different functions of a computer system, a computer peripheral, a product with an embedded computer, or a product with a digital logic circuit. Operation of an item value selector and its cooperation with other system elements may be better understood from an example computer peripheral employing an item value selector of the present invention.

Figure 1:
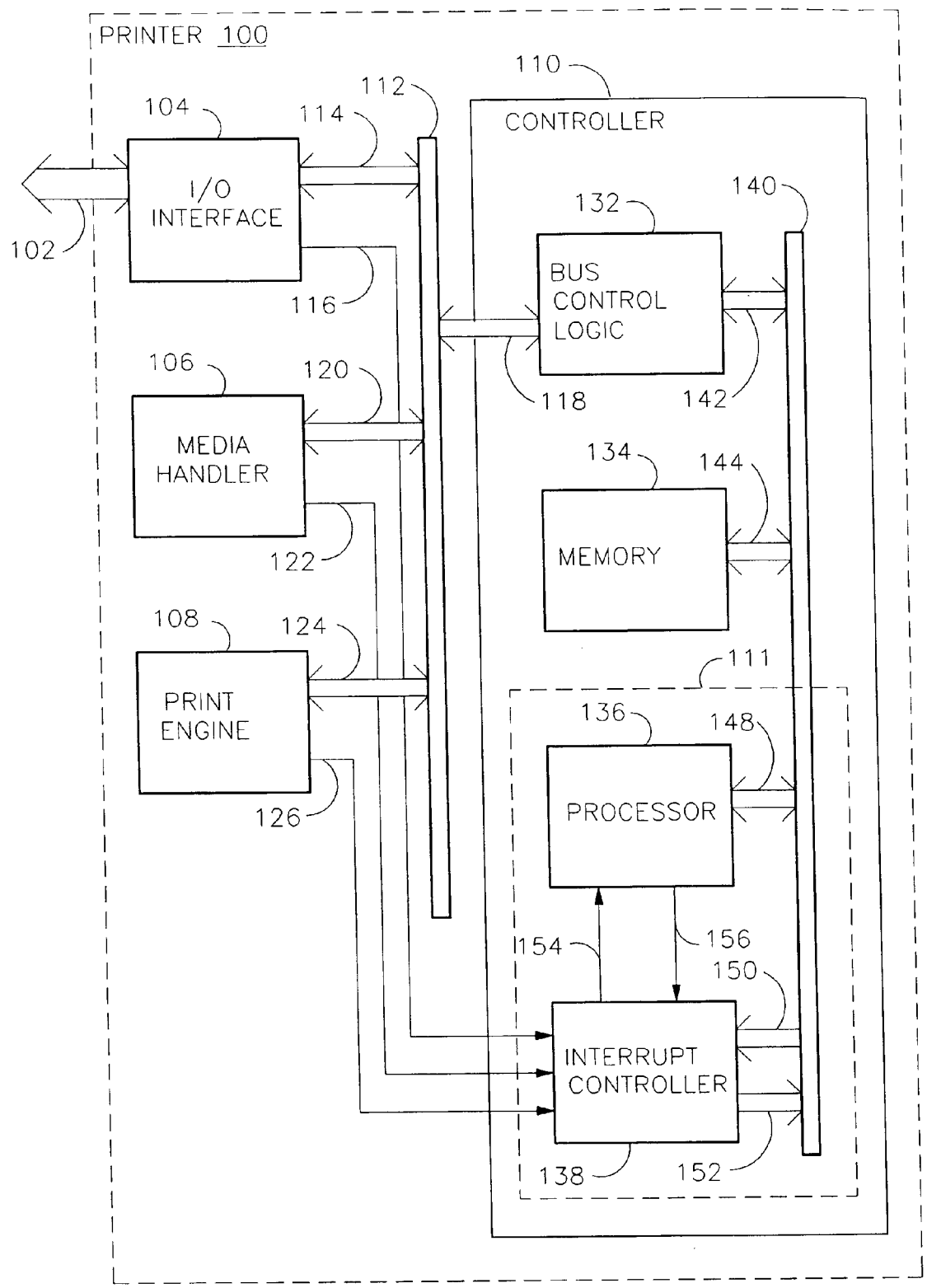
FIG. 1 is a functional block diagram of a printer according to various embodiments of the present invention.

Printer 100 of FIG. 1 is a computer peripheral of a conventional computer system for office use. Printer 100 includes I/O interface 104, media handler 106, print engine 108 and controller 110, all of which communicate via a conventional data and control bus 112. I/O interface 104 includes a conventional interface that receives data and commands and provides status via signal interface 102. On receipt of data to be printed, for example, I/O interface 104 asserts an interrupt request on line 116 and (when appropriate) presents the data via path 114, bus 112, and path 118 to controller 110. Media handler 106 includes a conventional media handler that selects media to be directed through print engine 108 and directs binning of printed media received from print engine 108. The functions of media handler 106 may be implemented by various apparatus distributed within printer 100 and may in part be integral to print engine 108. On receipt of data to be printed, controller 110 may, for example, then direct media handler 106 by commands via path 118, bus 112, and path 120 to prepare to provide media from a specified source tray and to collate the printed copies in a specified manner. When media handler 106 has new status or requires further direction, media handler 106 asserts an interrupt request on line 122 and (when appropriate) presents status or receives additional commands and data via path 120, bus 112, and path 118. Assuming that the data received by I/O interface 104 is to be printed, controller 110 analyzes the received data and may prepare reformatted data. Print engine 108 includes any conventional printing apparatus including, for example, laser printing and ink jet printing capability. Controller 110 directs print engine 108 by commands and supplies received data or reformatted data (depending on the computational complexity of print engine 108) to print engine 108 via path 118, bus 112, and path 124. Print engine 108 prints on the media in any conventional manner and may report completion or other status (e.g. ready for more data to print) by asserting an interrupt request on line 126. All of the interrupt requests described above are received by controller 110 and each initiates an interrupt acknowledgement procedure in cooperation with an item value selecter of the present invention.

Controller 110 includes integrated circuit 111, memory 134, and bus control logic 132, all of which communicate via a conventional data and control bus 140. Controller 110 includes conventional physical structures (e.g. analog and digital circuit assemblies) and conventional functional components (e.g. state machines, stored program processors, and discrete logic) except as described below.

Integrated circuit 111 includes conventional processor 136 (e.g. a macro cell) and interrupt controller 138 formed on a single integrated circuit substrate by conventional semiconductor process technologies. Integrated circuit 111 cooperates with memory 134 via bus 140 and path 144 in a conventional manner to fetch processor instructions and to read and write data. Either processor 136, memory 134, or both may include conventional direct memory access circuits for efficient utilization of bus 140. Memory 134 cooperates with bus control logic 132 via path 144, bus 140, and path 142 in a conventional manner to receive or provide data, commands, or processor instructions. Processor 136 cooperates with bus control logic 132 via path 148, bus 140 and path 142 in a conventional manner to establish initial conditions external to circuit 111 and to control printer operation. Bus control logic 132 includes conventional bridge, buffering, and caching circuits to facilitate efficient communication between buses 140 and 112.

Interrupt controller 138 receives interrupt requests on lines 116, 122, and 126, as discussed above, and includes an item value selector (not shown). When one or more interrupt requests are received by interrupt controller 138, interrupt controller 138 asserts an interrupt request on line 154 to processor 136. At an appropriate point in processing, processor 136 asserts an interrupt acknowledge signal on line 156. On receipt of the interrupt acknowledge signal, interrupt controller provides to processor 136 on path 152, bus 140, and path 148 an interrupt identifier. The interrupt identifier is used by processor 136 to transfer program control to instructions for servicing the appropriate interrupt source, as discussed above.

Each interrupt request includes a request signal and may further include an interrupt priority signal conveyed on the respective line. When an interrupt priority signal is included, each respective line is implemented as a group of parallel conductors so that the priority signal is presented to interrupt controller 138 as an item value in binary parallel format. Preferably, however, the associated item value is retained in interrupt controller 138 to avoid additional signal pins on integrated circuit 111. When several interrupt requests are received by interrupt controller 138, interrupt controller 138 determines the highest priority interrupt source having a pending interrupt request and passes the associated item value to the processor as part of the interrupt identifier. That portion of the interrupt identifier containing the item value is provided as an output of the item value selector of interrupt controller 138.

Item values (codes), when used to determine interrupt priority, are set to allow interrupt sources that cannot tolerate a long interrupt latency (a delay between interrupt request and interrupt servicing) to be serviced ahead of interrupt sources that can. In other words, if the consequences to system operation of failing to service an interrupt source in a given time period are not severe, that interrupt source is said to be able to tolerate the time period as an interrupt latency. Item values may be determined by processor 136 with reference to memory 134 and then stored in appropriate registers in interrupt controller 138, by conventional signaling via path 148, bus 140, and path 150. Once all respective item values have been set in interrupt controller 138, and on the occurrence of multiple interrupt requests, the item value selector of interrupt controller 138 provides the item value associated with the highest priority interrupt. Generally, and as assumed for simplicity in the explanations that follow, the item value associated with the highest priority interrupt is the maximum of the item values implicated in the occurrence of multiple interrupt requests. When negative logic conventions (or DeMorgan equivalent representations) are used, the item value may be interpreted as the minimum item value.

A variation of printer 100 includes multiple I/O interfaces for a wide variety of communication methods, and a greatly expanded interrupt controller for responding to numerous interrupt sources. Although three interrupt sources are described above associated with lines 116, 122, and 126, an important variation of printer 100 has more than 20 interrupt sources, each with an individual line to a central interrupt controller. In future versions of such a variation it is likely that the number of interrupt sources will continue to increase in number and variety. Interrupt controller 138 employs an expandable architecture to facilitate development of such future products. This beneficial expendability is largely due to aspects of an item value selector of the present invention.

An item value selector of the present invention includes an arithmetic-logic circuit having a selection circuit in cooperation with product and summary term generators. Such an item value selector is expandable with little or no increase in propagation delay and circuit complexity. For example, the expandable architecture of interrupt controller 138 is shown in relevant part in FIG. 2.

Signal notations used in FIGS. 2 through 6 include a designation of the number of signal lines (i.e. bit positions) in binary parallel format. For example, in FIG. 2, maximum value signal MV on line 152 is described as a total quantity B bits numbered b (MSB) to 1 (LSB), i.e. MV[b:1]. An individual signal is designated with a subscript for its bit position. For instance, $MV_1$ is the least significant bit (LSB). In some cases the number of lines comprising a first signal matches the number of lines in a second signal. This design feature is indicated by using the same total quantity of bits, for example, AV[b:1] includes a total quantity of B bits, numbered in the same manner as signal MV.

The expandable architecture of interrupt controller 138 primarily includes an array 202 of item generators, request logic 204, summary term generator 206, and selection circuit 208. Array 202 includes item generators 224, 226, and 228 as shown. Each item generator performs logic operations for supporting a corresponding interrupt request signal. For example, item generator 224 receives signal IA on line 116; item generator 226 receives signal IB on line 122, and item generator 228 receives signal IC on line 126.

Request logic 204 generates interrupt request signal IRQ to processor 136 on line 154 in response to any interrupt request signal IA, IB, or IC. In a variation, request logic 204 includes a conventional holding latch (not shown) for each interrupt request signal IA, IB, and IC so that such an interrupt request signal, after setting the respective holding latch, can be removed by the interrupt source. The holding latch output then drives the respective line 116, 122, or 126 to enable circuits within the respective item generator, such as item value register 244 as shown. In another variation, request logic 204 further includes conventional mask logic (not shown) implemented with a mask register within request logic 204. When such a mask register is written from processor 136 on path 150 (connection not shown), a respective interrupt signal IA, IB, or IC is not latched and does not cause assertion of signal IRQ on line 154. Hence, occurrences of an interrupt request from a particular interrupt source are ignored while the respective mask bit is set. The mask register may be cleared in the same manner as written from processor 136 or in any other conventional manner to permit interrupt requests to be acknowledged.

Request logic 204 responds to interrupt acknowledge signal IAK on line 156 to provide an output enable signal OE on line 221 to activate selection circuit 208 in a manner to be discussed below, and after a suitable delay, to release the holding latch, if used. It is expected that the software that services the respective interrupt will affect the interrupt source to remove the respective interrupt request signal IA, IB, or IC in the conventional manner.

Each item generator as shown includes a respective group value register 242, comparator 248, item value register 244, and product term generator 252. Path 150 from processor 136 provides binary signal G[r:1] to each respective comparator 248 during interrupt acknowledgement. Registers 242 and 244 receive initial and subsequent values from processor 136 via path 150. Group value register 242 provides group value signal AH[r:1] on line 243 to comparator 248. Item value register 244 provides item value signal AV[b:1] on line 245 to product term generator 252.

In a variation, registers 242 and 244 are written simultaneously to avoid inconsistent intermediate combinations of values between the two registers. In a preferred variation, registers 242 and 244 comprise one register wherein the more significant bits provide the group value AH[r:1] on path 243 and the lesser significant bits provide the item value signal AV[b:1] on path 245. In yet another variation, interrupt sources are not grouped and group register 242 and comparator 248 are eliminated with suitable simplifications to product term generator 252. In still another variation, item values are not programmable and register 244 is replaced with a suitable switch bank or dedicated connections to fixed logic levels.

In operation of item generator 224 as shown, during an interrupt acknowledgement procedure performed by processor 136, group signal G[r:1] is asserted. Comparator 248 compares group signal G[r:1] at its A input to a group value register signal AH[r:1] at its B input and asserts signal PARTICIPATE on line 250. Since each item generator receives the group signal G[r:1] at its respective comparator and each comparator performs a comparison to the contents of the respective group value register signal within each item generator, only a selected number of item generators of array 202 will participate in generation of a maximum item value signal MV[b:1] on path 152. The selected item generators are exclusively the members of the requested group. The membership in a particular group is established by processor 136 when respective group value register contents were initialized or written by processor 136. When the respective PARTICIPATE signal (e.g. on line 250) in an item generator of array 202 is not asserted, the respective product term generator (e.g. 252) does not assert product term signals (e.g. APT[p:1] on line 254). Finally, during the interrupt acknowledgement procedure, the maximum item value (and in a variation, in combination with the group value) are provided to processor 136 as the interrupt identifier used via a vector table to transfer control to the highest priority interrupt service routine.

A product term generator includes any logic circuit that provides one or more sets of product terms, each product term being responsive to a logic AND combination of item value signals. For example, product term generator 252 provides product term signal APT[p:1] on line 254 in response to item value signal AV[b:1] when enabled as discussed above with respect to signal PARTICIPATE on line 250. The logic AND combination of item value signals may be better understood with reference to FIG. 3.

A product term generator in a general and preferred circuit 300 includes a quantity P of AND gates, one gate for each product term signal PT[p:1]. Each product term is generated by an AND gate having an input for a PARTICIPATE signal 350 and additional inputs determined from a design rule as follows. For each next lower significant bit of the item value signal V[b:1] 345, combine that bit of the item value signal with all combinations of higher order bits of the item value signal to form a set of product terms.

A first set, SET0, includes one ($2^0$) product term $P_p$ provided by gate 302. Gate 302 includes an input for item value bit $V_b$ (MSB).

A second set, SET1, includes two ($2^1$) product terms. The order of AND combinations is important. Specifically, product term $P_{p-1}$, provided by gate 304, results from the AND combination of inputs including $V_b$ and $V_{b-1}$, i.e. all more significant bits. Next, product term $P_{p-2}$, provided by gate 306, results from the AND combination of inputs including only $V_{b-1}$.

In a like manner, set, SET2, includes four ($2^2$) product terms. Gate 308 provides product term $P_{p-3}$ from the AND combination of $V_b$, $V_{b-1}$, and $V_{-2}$. Gate 310 provides product term $P_{p-4}$ from the AND combination of $V_b$ and $V_{b-2}$. Gate 312 provides product term $P_{p-5}$ from the AND combination of $V_{b-1}$ and $V_{b-2}$. Finally, gate 314 provides product term $P_{p-6}$ from only $V_{b-2}$.

When item value signal V has 3 bits, product term generator 300 provides $2^3-1$ product term signals, in 3 sets, and includes $2^3-1$ or 7 gates. Generally, when item value signal V has B bits, the appropriate product term generator provides $2^B-1$ product terms (i.e. signal PT[p:1] where $P=2^B-1$), in B sets, and includes $2^B-1$ gates. Expansion of product term generator 300 to J=B+1 input value signal lines will include the generation of one additional set of product term signals using merely $2^J-1$ gates. The gates (and their inputs) in existing sets will be unaffected. Generally, the product term generators in other item generators of array 202 are expanded in a similar manner.

A summary term generator according to various aspects of the present invention includes any circuit responsive to the logic OR combination of respective product term signals for providing a summary term signal. In operation with grouped item value signals, an item value signal from a non-identified group does not affect the resulting product term signal. For example, summary term generator 206 provides summary term signal ST[p:1] in response to the OR combination of respective product term signals from each item generator of array 202. In general, summary term signal $ST_n$, is responsive to the logic OR combination of item generator A 224 product term signal $APT_n$, item generator B 226 product term signal $BPT_n$, and item generator C 228 product term signal $CPT_n$. The logic OR combination of product term signals may be better understood with reference to FIG. 4.

A summary term generator in a general and preferred circuit 400 includes a quantity P of OR gates, one gate for each summary term signal ST[p:1] 260. Each summary term bit is generated by an OR gate having an input for each respective product term signal. Gate 402 generates summary term $ST_P$ (MSB) in response to inputs $APT_p$, $BPT_p$, and $CPT_p$. Gate 404 generates summary term $ST_{p-1}$ in response to inputs $APT_{p-1}$, $BPT_{p-1}$, and $CPT_{p-1}$. Gate 406 generates summary term $ST_1$ (LSB) in response to inputs $APT_1$, $BPT_1$, and $CPT_1$. Expansion of summary term generator 400 to J=B+1 input value signal lines will include the addition of one gate input to every existing OR gate and the addition of 1 OR gate for the added product term signal. Expansion of summary term generator 400 to accommodate an additional item generator of set 202 includes merely the addition of one gate input to every existing OR gate.

A selection circuit according to aspects of the present invention includes any logic circuit that determines (e.g. calculates) an extreme item value by logic combination of summary term signals. In one variation, a more significant summary term signal bit effects selection between two or more lesser significant summary term signal bits. In operation with item value signals, such a logic circuit determines a maximum item value signal (or minimum with negative logic), being the value of one of the item value signals. In operation with grouped item value signals, the maximum item value signal is responsive to item values (e.g. a set) of the identified group of item value signals.

Figure 5:
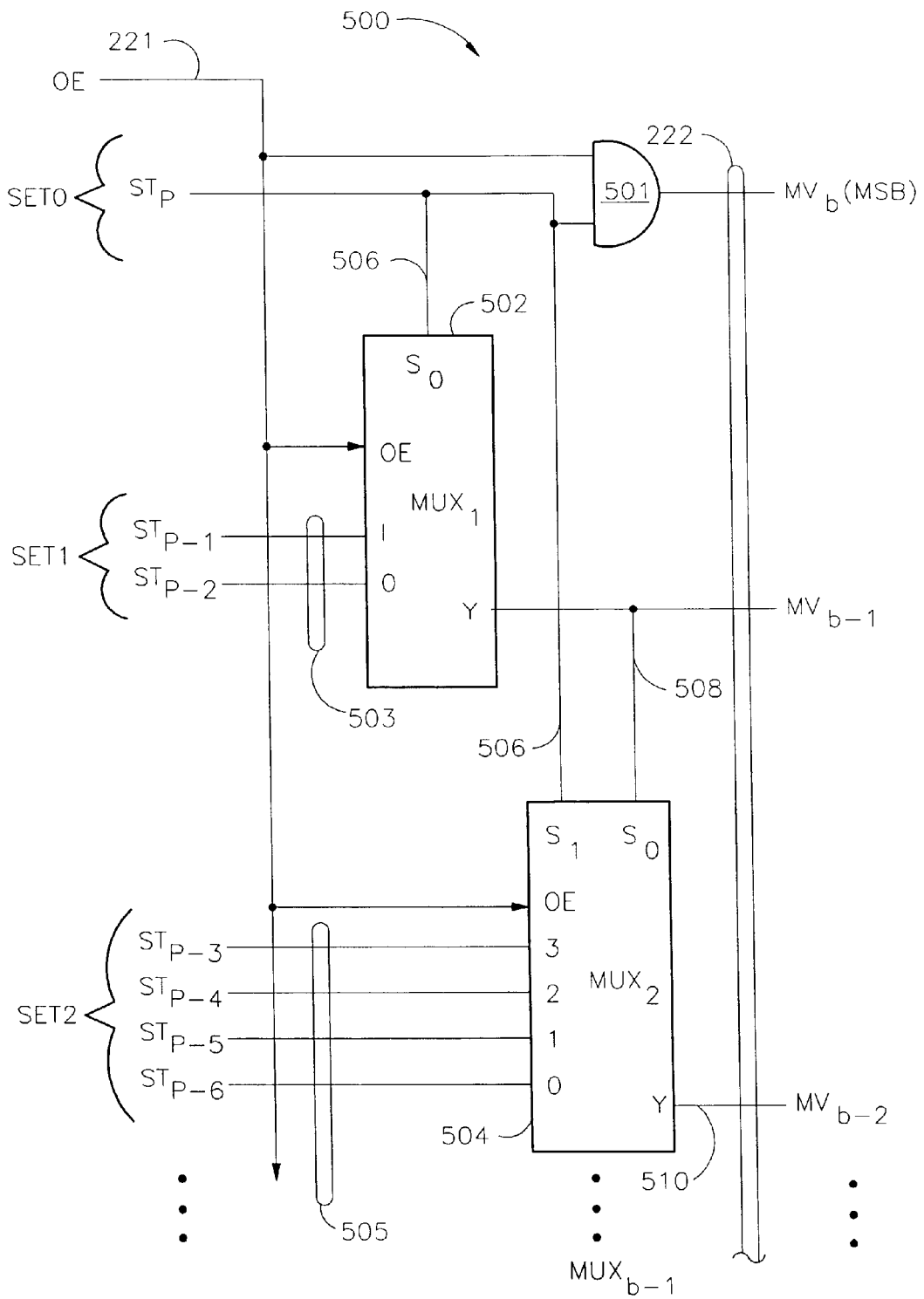
FIG. 5 is a schematic diagram of a portion of the selection circuit of FIG. 2.
Figure 6:
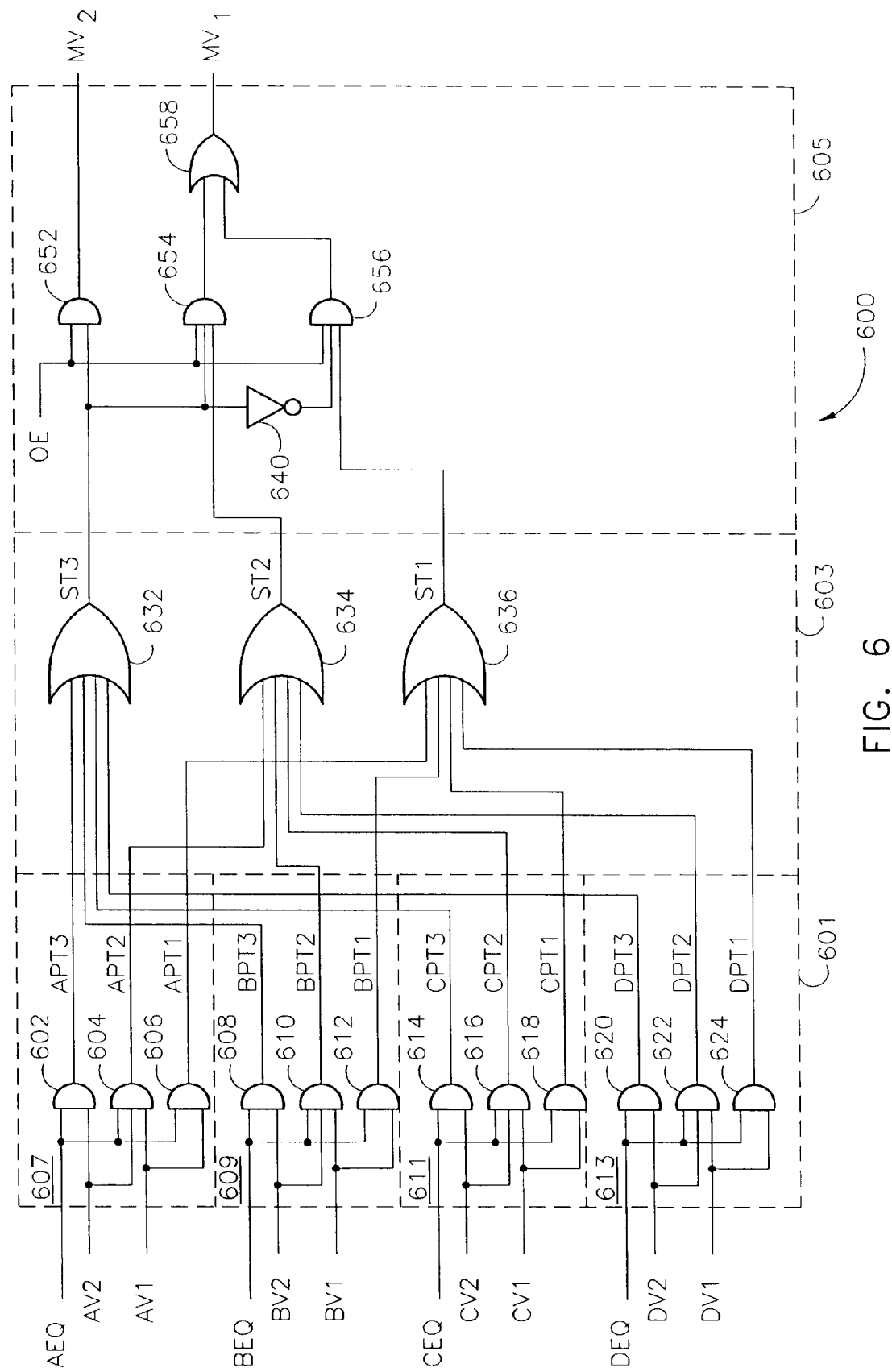
FIG. 6 is a schematic diagram of a portion of an arithmetic-logic circuit comprising a product term generator, a summary term generator, and a selection circuit according to various embodiments of the present invention.

A selection circuit in a general and preferred circuit 500 of FIG. 5 includes AND gate 501 and a respective conventional multiplexer 502 and 504 for each set, except for SET0. Output enable signal OE on line 221 permits connection of signal MV 222 to path 152 for driving path 152 during a relevant portion of the interrupt acknowledge procedure.

Each multiplexer 502 and 504 includes data inputs and control inputs. The signals of a respective set 503 and 505 are coupled to each respective multiplexer 502 and 504. The control inputs of a particular multiplexer are coupled to all summary term signals of more significance than the highest significant summary term signal of the set input at the data inputs of that particular multiplexer. Finally, a control input is coupled to output enable signal OE on line 221 for operation as described above. For example, signal 503 input to data inputs of MUX1 502 makes up SET1 in that summary term signals $ST_{p-1}$ and $ST_{p-2}$ have subscripts corresponding to product term signals $PT_{p-1}$ and $PT_{p-2}$ as shown on FIG. 3. Similarly, signal 505 input to data inputs of MUX2 504 makes up SET2.

AND gate 501 and multiplexers 502 and 504 provide maximum value signal MV[b:1] 222. AND gate 501 provides signal $MV_b$ (MSB). MUX1 502 provides signal $MV_{b-1}$. And, MUX2 504 provides signal $MV_{b-2}$. Additional item generators in array 202 do not require expansion of selection circuit 500 without a concomitant expansion of item value signal bits.

In a variation of selection circuit 500, multiplexer outputs are stored in a register which then provides output signals MV[1 :b]. The register has an output disable/enable capability. In this variation, output enable signal OE on line 221 controls the register output disable/enable capability, gate 501 is eliminated, and suitable simplifications are made to multiplexers 502 and 504.

As discussed above, item value selector circuits have wide application. In applications apart from interrupt control, an item value selector includes primarily an arithmetic-logic circuit having an array of product term generators, a summary term generator, and a selection circuit. For example, item value selector 600 of FIG. 6 receives 4 2-bit item value signals AV[2:1], BV[2:1], CV[2:1], and DV[2:1] and provides a 2-bit maximum item value signal MV[2:1]. Item value selector 600 includes array 601 of product term generators, summary term generator 603, and selection circuit 605.

Array 601 includes product term generators 607, 609, 611, and 613. Product term generator 607 includes AND gates 602, 604, and 606 for providing product term signal APT[3:1]. Product term generator 609 includes AND gates 608, 610, and 612 for providing product term signal BPT [3:1]. Product term generator 611 includes AND gates 614, 616, and 618 for providing product term signal CPT[3:1]. Product term generator 613 includes AND gates 620, 622, and 624 for providing product term signal DPT[3:1].

Summary term generator 603 includes OR gates 632, 634, and 636. OR gate 632 combines respective product terms $APT_3$, $BPT_3$, $CPT_3$, and $DPT_3$ to provide summary term $ST_3$. OR gate 634 combines respective product terms $APT_2$, $BPT_2$, $CPT_2$, and $DPT_2$ to provide summary term $ST_2$. OR gate 636 combines respective product terms $APT_1$, $BPT_1$, $CPT_1$, and $DPT_1$ to provide summary term $ST_1$.

Selection circuit 605 includes inverter 640, AND gates 652, 654, and 656, and OR gate 658. Inverter 640, AND gates 654 and 656, and OR gate 658 operate as a conventional multiplexer responding to signal $ST_3$ on a control input and responding to signals $ST_2$ and $ST_1$ on respective data inputs.

Several variations of maximum item selector 600 may permit lower over-all propagation delay. For example, signals AEQ, BEQ, CEQ, and DEQ which correspond in function to signal PARTICIPATE, as discussed above, may be eliminated in applications having no higher order item value bits (beyond the bits input to a product term generator) or having no grouping of item value signals. In another variation, NAND gates may be substituted for all gates shown in FIG. 6 with the addition of an inverter on the output of gate 652. In yet another variation, a respective wired-OR connection may be used in place of gates 632, 634, and 636.

In the claims that follow, a notation is used for describing several signals. In this notation, a sigma symbol represents a logic OR combination of the terms defined by subscripts that include the series defined in the limits under and above the sigma symbol. Further, a pi symbol represents a logic AND combination of the factors defined by subscripts that include the series defined in the limits under and above the sigma symbol. Conventional mathematical rules apply to expressions involving the sigma and pi symbols. Subscripts designate first which item (i) and then which input signal of that item (b). For example, input signal CV2 is the most significant signal (2) of the third (C) item and therefore corresponds to $V_{32}$.

For example, signal $MV_2$ (MSB) is responsive to signal $ST_3$ output of gate 632 which is responsive to the respective most significant bit of each item value signal AV[2] (i.e. $V_{12}$), BV[2] (i.e. $V_{22}$), CV[2] (i.e. $V_{32}$) and DV[2] (i.e. $V_{42}$). According to the syntax discussed above:

$$MV_B := \sum_{i=1}^{I} V_{iB}$$

where I is the total number of item values (e.g. 4 in FIG. 6); and B is the total number of bits per item value (e.g. 2 in FIG. 6); and the symbol ":=" differs from equality by permitting additional logic inputs and operations (i.e., ":=" means "is responsive to").

In another example of this syntax, signal $MV_1$ (LSB) is responsive to signal $ST_3$ and signal $ST_2$. Signal $ST_3$ is provided by gate 632 as discussed above. Signal $ST_2$ is provided by gate 634 having inputs defined by gates 604, 610, 616, and 622. According to the syntax and variable definitions discussed above:

$$MV_1 := \left\{\sum_{i=1}^{I} V_{iB}\right\} \cdot \left\{\sum_{i=1}^{I} \prod_{b=1}^{B} V_{ib}\right\}$$

where a logic AND operation is represented by the raised dot symbol.

In another example of this syntax, signal $MV_1$ (LSB) is further responsive to the OR combination function of gate 658 and the OR combination function of gate 636. According to the syntax and variable definitions discussed above:

$$MV_1 := \overline{\left\{\left\{\sum_{i=1}^{I} V_{iB}\right\} \cdot \left\{\sum_{i=1}^{I} \prod_{b=1}^{B} V_{ib}\right\}\right\}} + \sum_{i=1}^{I} V_{iI}$$

where a logic inversion operation is represented by the NOT symbol ("‾") having highest precedence, a logic OR operation is represented by the plus symbol and has lower precedence than the logic AND operation.

Alternative embodiments of the present invention, whether apparatus or methods, include general and special purpose computer systems, computer system peripheral equipment (e.g. processors, memory devices, bus arbitration devices, network communication devices, data storage devices, printers, displays, input devices, and instrumentation, to name a few), and products having embedded digital circuits (e.g. signal switching devices, process control devices, system management devices, and application specific integrated circuits, to name a few).

Figure 7:
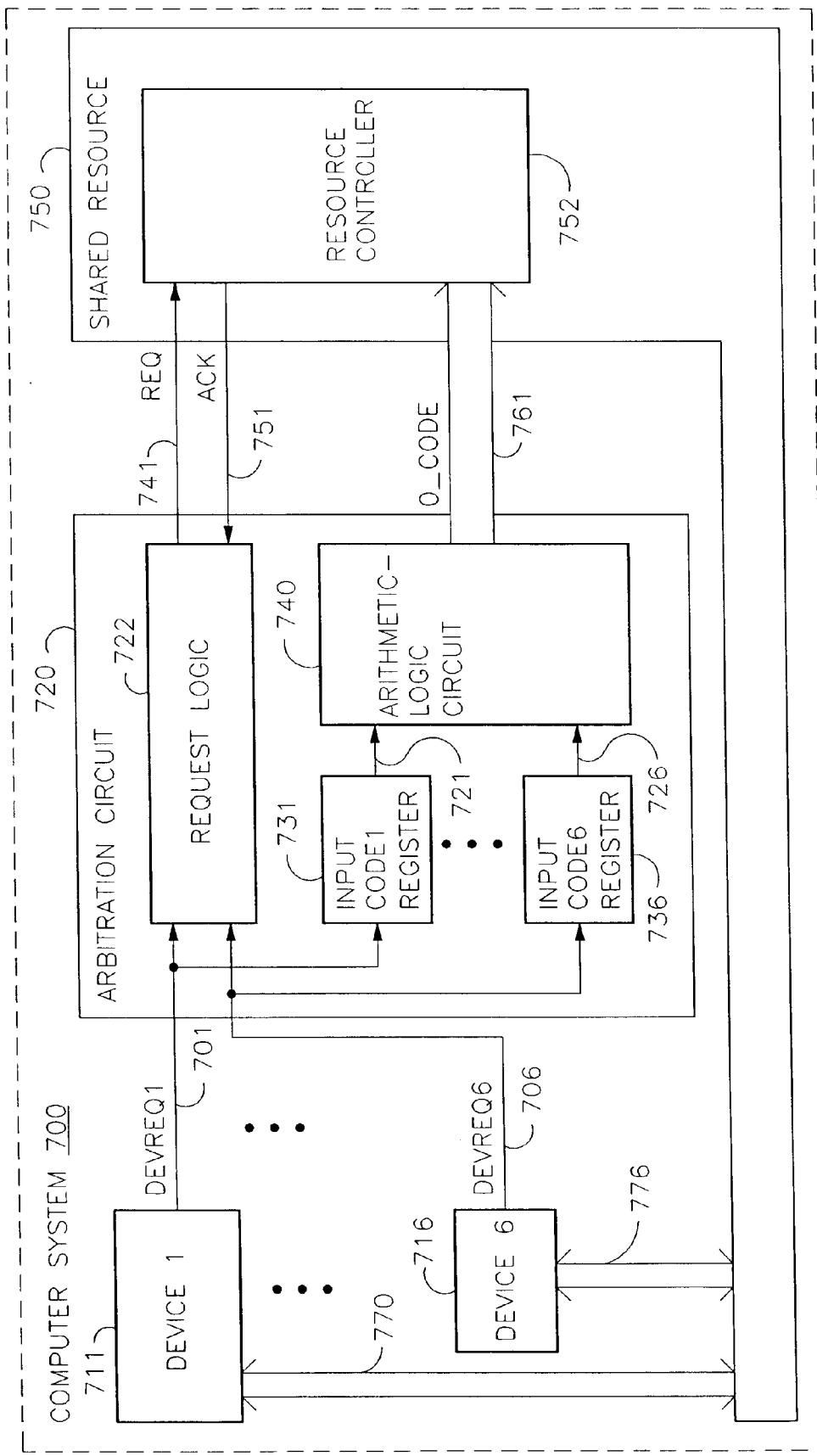
FIG. 7 is a functional block diagram of a computer system according to various embodiments of the present invention.

A common resource may be shared by multiple devices according to various aspects of the present invention. For example, computer system 700 of FIG. 7 includes devices 711 through 716, arbitration circuit 720, and shared resource 750. Devices 711 through 716 represent two of a plurality of six devices that compete for exclusive use of shared resource 750. To request use of shared resource 750, each device may at any time provide a device request signal (e.g. DEVREQ1 on line 701 through DEVREQ6 on line 706) to arbitration circuit 720.

An arbitration circuit includes any circuit that determines which one of several competing device requests is to be presented to the shared resource so that the shared resource can be dedicated to the highest priority requesting device. For example, arbitration circuit 720 includes request logic 722, input code registers 731 through 736, and arithmetic logic circuit 740. Request logic 722 receives each device request signal (e.g. DEVREQ1) on a separate line (e.g. line 701). When any DEVREQ signal is being received, request logic 722 asserts request signal REQ on line 741. In addition, the respective input code register (e.g. input code register 731 corresponding to device 711 and DEVREQ1) provides a signal on line 721 to arithmetic logic circuit 740. When more than one DEVREQ signal is being received, arithmetic-logic circuit 740 receives more than one input code. For example, if input code register 731 stored a binary 8-bit number indicating the priority of device 1 (e.g. hexadecimal 0x4A) and input code register 736 stored a binary 8-bit number indicating the priority of device 6 (e.g. 0xB9), then arithmetic-logic circuit 740 would be in receipt of a parallel binary signal for the code 0x4A on 8 parallel input code signal lines 721 and in reciept of a parallel binary signal for the code 0xB9 on 8 parallel input code signal lines 726.

Figure 2:
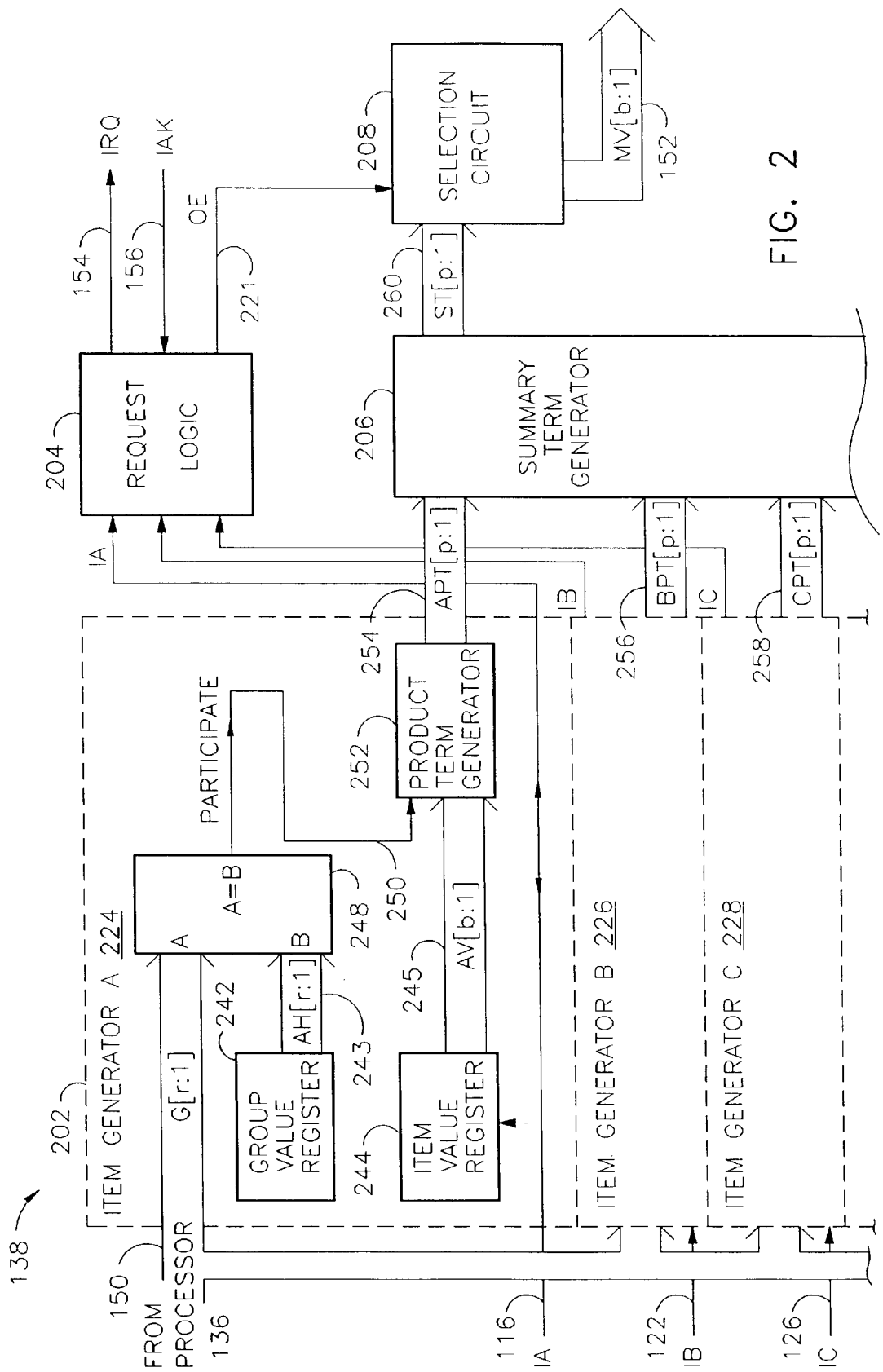
FIG. 2 is a functional block diagram of a portion of the interrupt controller of FIG. 1.
Figure 3:
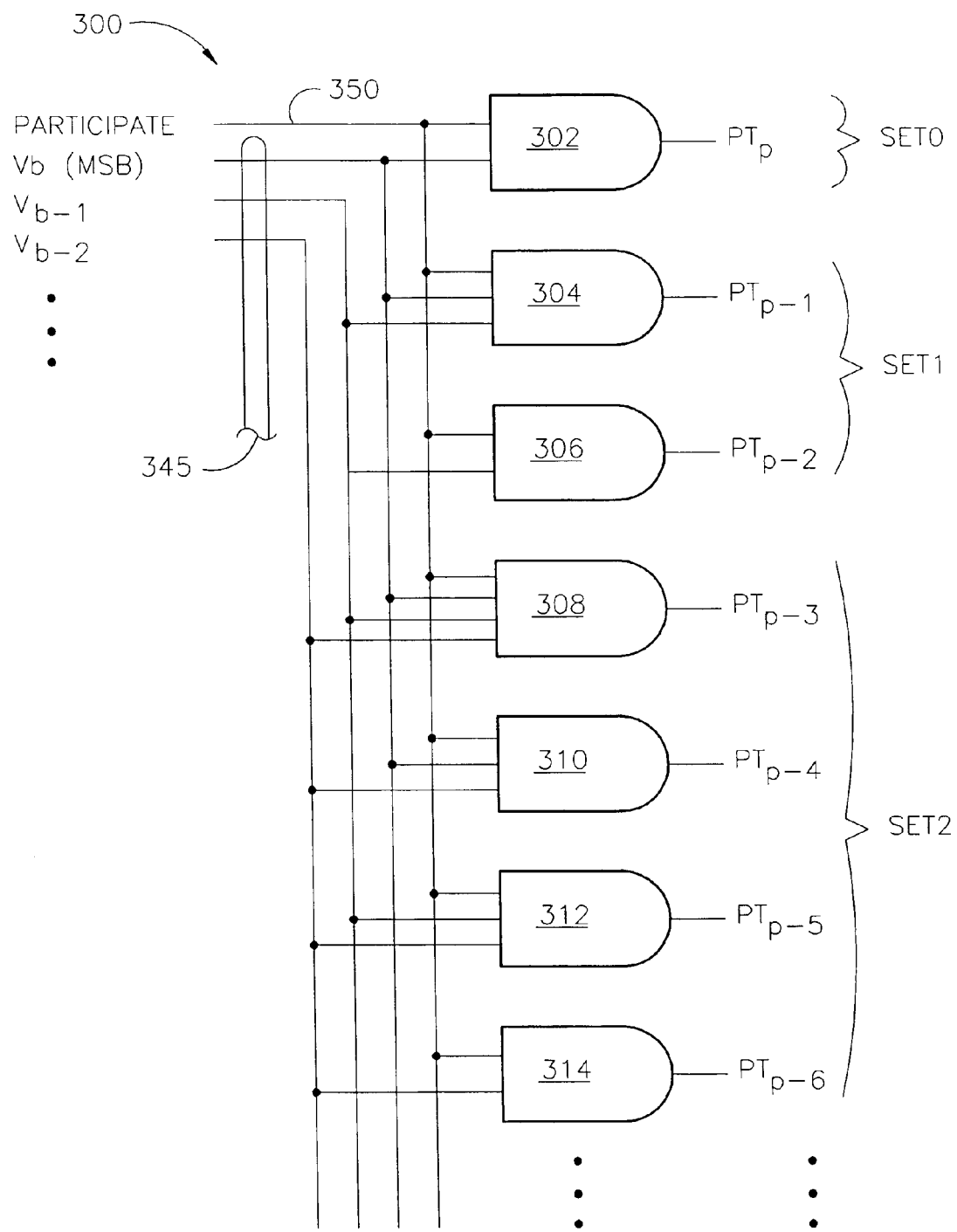
FIG. 3 is a schematic diagram of a portion of a product term generator of FIG. 2.
Figure 4:
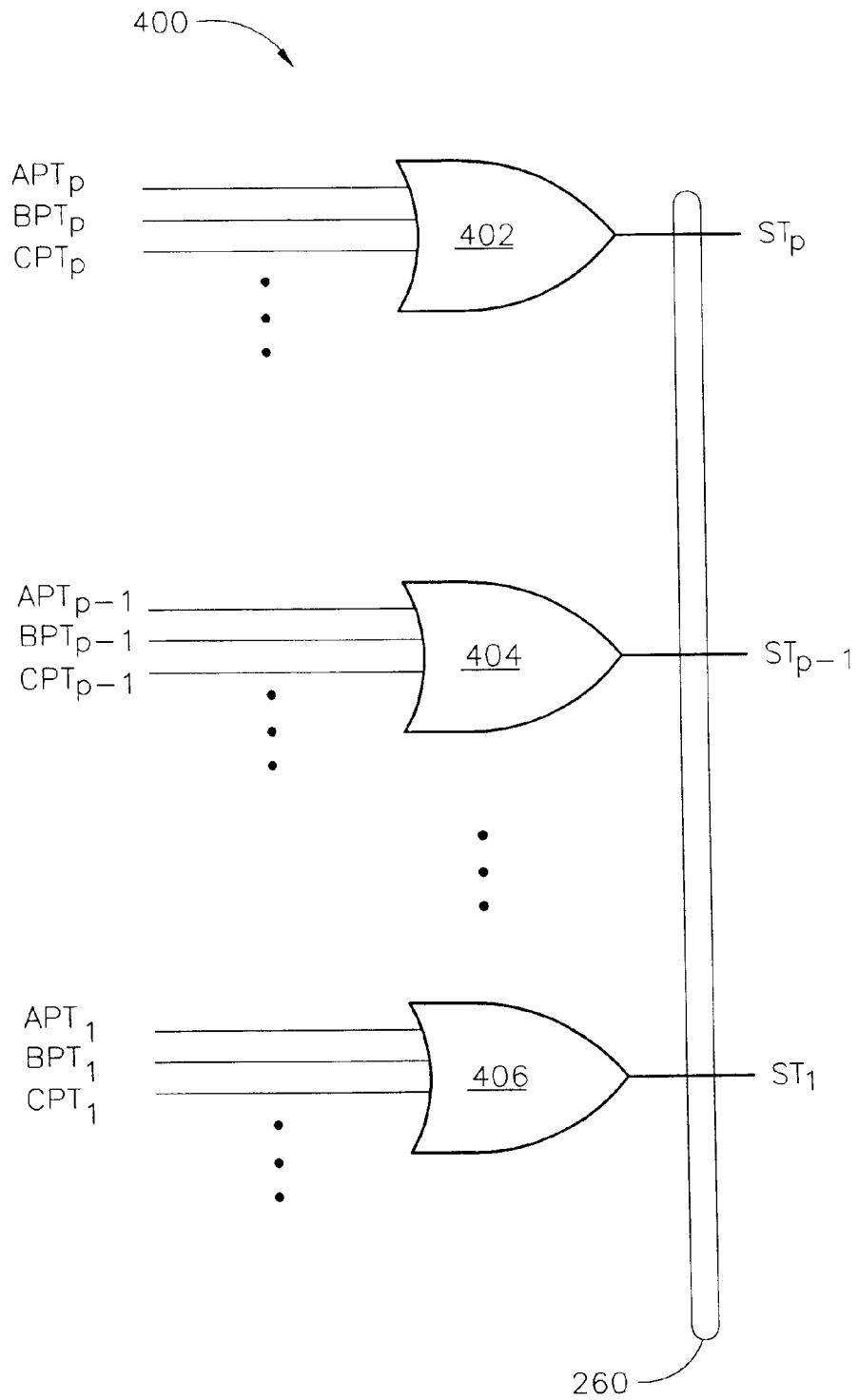
FIG. 4 is a schematic diagram of a portion of the summary term generator of FIG. 2.

Arithmetic-logic circuit 740 includes a product term generator for each plurality of input code signals (i.e. for each input code register 731 through 736), a summary term generator, and a selection circuit all having the structure and operation as described for similarly named functional blocks shown for example in FIG. 2. Therefore, arbitration circuit 720 provides an output code on a plurality of output code signal lines 761. The output code corresponds to an extreme of the currently presented input code signals. For example, using positive logic, arithmetic-logic circuit 740 provides output code 0xB9 on 8 parallel output code signal lines 761 because input code 0xB9 has a greater arithmetic integer magnitude than input code 0x4A.

Shared resource 750 includes resource controller 752 and the shared resource functions (not shown). Shared resource 750 represents any computing component or device. Shared resource functions may include, for example, a bus, a data storage device, a port on a data storage device, an instrument (e.g. for measurement, control, analysis, recording, or display), a network communication device, a computer (e.g. a general or special purpose processor), or a computer peripheral, to name a few. Resource controller 752, provides signal ACK on line 751 to acknowledge signal REQ and then receives output code signals O_CODE on lines 761. Resource controller 752 uses the output code to identify the device with which to exclusively cooperate. Such cooperation may include data transfer on a dedicated interface for each device (e.g. interface lines 770 through 776 respectively for device 711 through 716) or may include data transfer on one interface shared by all devices (e.g. a conventional shared bus).

Computer system 700 efficiently shares shared resource 750 as a result of the low propagation delay associated with arithmetic-logic circuit 740. Because many computer system designs are expanded in practice, computer system 700 in an expanded form operates with the benefits related to expansion of arithmetic-logic circuit 740 as discussed above.

Figure 8:
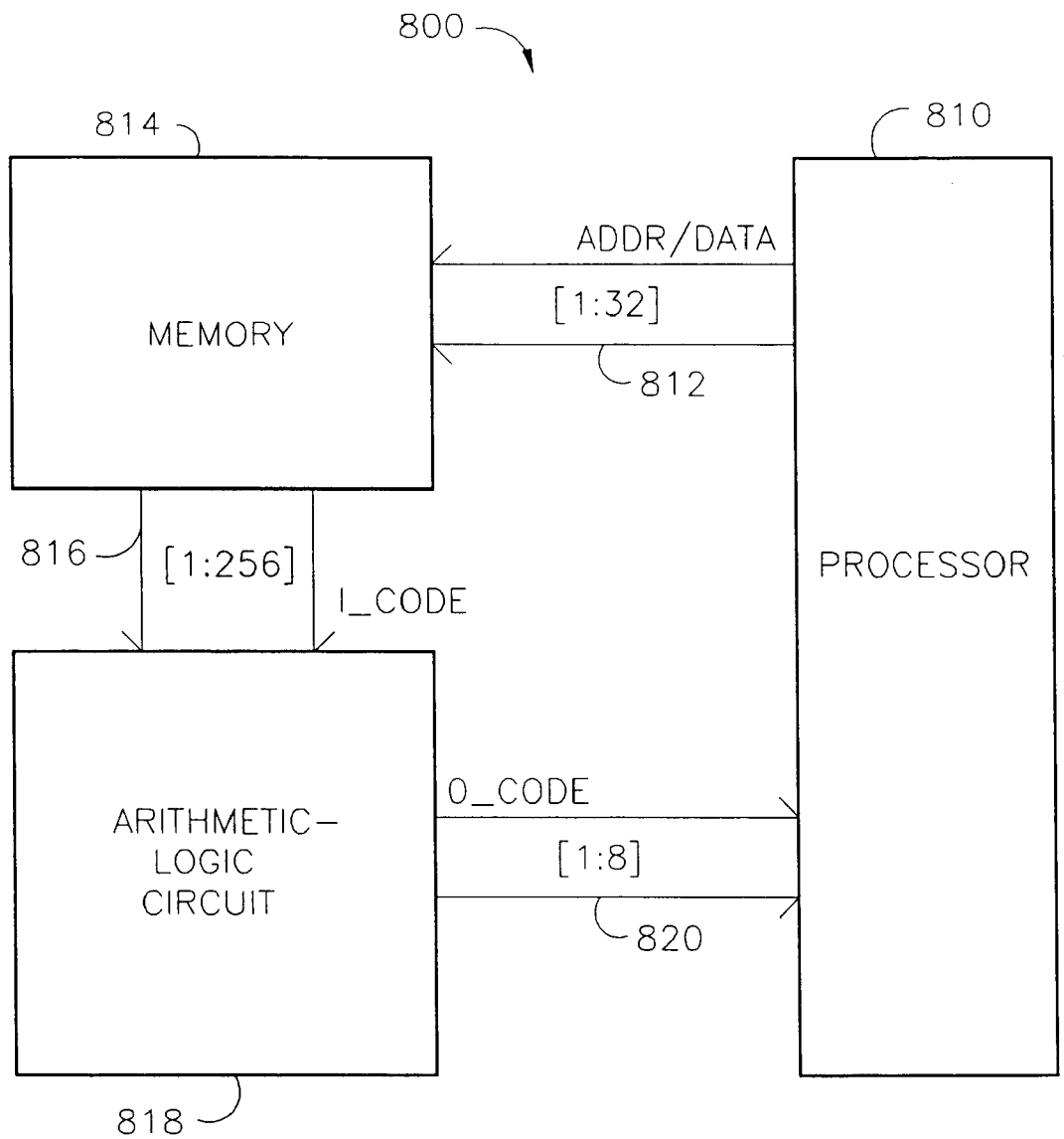
FIG. 8 is a functional block diagram of a system for sorting codes according to various embodiments of the present invention.

A method according to the present invention determines an output code having a magnitude corresponding to an extreme magnitude of a plurality of input codes. Each input code has a magnitude, for example an integer value in any parallel signalling format. For signalling formats other than binary, (e.g. ternary, binary coded decimal, etc.) a suitable conversion to binary may be made as a preliminary step. The method includes three steps which may be better understood with reference to a system 800 of FIG. 8.

System 800 includes processor 810, memory 814, and arithmetic-logic circuit 818. Processor 810 may be any suitable conventional general or special purpose computer or microprocessor. Processor 810 provides conventional address and data signals to memory 814 on bus 812. Memory 814 may be any suitable serial or multiple plane memory system which stores data received on bus 812 and provides data from memory on bus 816. Data from memory includes input code signals I_CODE, for example a 256-bit word in parallel format on 256 lines. One I_CODE word, for example, includes 32 8-bit input codes in a conventional format. Arithmetic logic circuit 818 includes a product term generator for each 8-bit input code (e.g. 32 product term generators), a summary term generator, and a selection circuit having the structures and functions as described by way of examples above. Arithmetic-logic circuit 818 provides output code signal O_CODE on lines 820 as eight parallel output signal lines to processor 810. In a variation, signals between processor, memory, and arithmetic-logic circuit are conveyed in a conventional manner on a common bus with suitable conventional control signals.

System 800 performs the method including the steps of (a) storing the plurality of input codes from processor 810 into memory 814; (b) providing a multiplicity of input codes from memory 814 to arithmetic-logic circuit 818, each input code conveyed on a plurality of input signal lines in parallel format; and obtaining the output code signal O_CODE[1:8] having a value that corresponds to an extreme (e.g. maximum or minimum) magnitude of the presented input codes (i.e. 32 input codes on signal I_CODE[1:256]) from the arithmetic-logic circuit by receiving at processor 810 the plurality of output code signals O_CODE.

In one application of system 800, a list of input codes in arbitrary order is transferred to memory and received in sorted order by operation of the method. As each extreme value is read from memory, its locations in memory are set to a magnitude that will not participate in further extreme magnitude determinations.

In another application of system 800, memory 814 is filled with input codes by an input device not shown. Operation of the method may provide processor 810, for example, with a maximum value of input codes received over a period of time. In an alternative, the maximum input code may correspond to a point of interest in an array (e.g. 2-dimensional or multi-dimensional) for purposes of spacial or temporal tracking changes in the input data, assaying multiple sensors, or controlling other system components including computer peripherals, robotic devices, or network components.

In yet another application of system 800 where the extreme magnitude itself does not convey sufficient information to continue a particular data processing or system control function, system 800 includes a conventional content-addressable register (CAR) that holds a value of input code signals I_CODE. The CAR provides the location information (address) simultaneously with provision of the O_CODE signal.

The foregoing description discusses preferred embodiments of the present invention which may be changed or modified without departing from the scope of the present invention as measured by the claims.

What is claimed is:

1. Arithmetic-logic circuit for receiving a plurality of input codes and for determining an output code, each code having respective magnitude and being conveyed in parallel by a plurality of respective code signals, the circuit comprising:

a. for each respective plurality of input code signals, a respective product term generator, each product term generator for providing a respective plurality of product term signals, each product term signal indicative of an AND combination of respective input code signals, where the respective plurality of product term signals are compared to provide a comparison signal, and provide a product term signal of the plurality of product terms signals in response to the comparison signal;
b. a summary term generator for providing a plurality of summary term signals in parallel, each summary term signal indicative of an OR combination of a corresponding product term signal from each product term generator; and
c. a selection circuit for providing the plurality of output code signals according to an extreme of the respective magnitudes of the input codes, an output code signal being indicative of an AND combination of a multiplicity of summary term signals of the plurality of summary term signals.

2. A printer comprising:
a. a print engine for printing data on media, the print engine in operation providing a plurality of pending interrupt request signals; and
b. a printer controller comprising:
(1) a processor for providing a data to the print engine in accordance with an output code received in parallel by a plurality of output code signals; and
(2) an interrupt controller comprising:
(a) for each pending interrupt request signal:
1) a respective register for storing an input code and for providing a respective multiplicity of input code signals in parallel to convey the respective input code; and
2) a respective product term generator coupled to the respective register for providing a respective plurality of product term signals, each product term signal indicative of an AND combination of respective input code signals, where the respective plurality of product term signals are compared to provide a comparison signal, and provide a product term signal of the plurality of product terms signals in response to the comparison signal;
(b) a summary term generator for providing a plurality of summary term signals in parallel, each summary term signal indicative of an OR combination of corresponding product term signal from each product term generator; and
(c) a selection circuit for providing the output code signals, the output code conveying an extreme of the input codes associated with the pending interrupt request signals.

3. The printer of claim 2 wherein the processor is coupled to each respective register for storing the respective input code value for each interrupt request.

4. The printer of claim 2 wherein the printer controller is formed on one integrated circuit substrate.

5. A computer system comprising:
a. a plurality of devices, each device providing a respective device signal;
b. an arbitration circuit comprising:
(1) a respective input code register that stores an input code having a magnitude, each register providing, in response to the corresponding device signal, a respective plurality of input code signals in accordance with the respective stored input code, each input code associated with a device of the plurality of devices; and
(2) an arithmetic-logic circuit comprising:
(a) for each respective plurality of input code signals, a respective product term generator, each product term generator for providing a respective plurality of product term signals, each product term signal indicative of an AND combination of respective input code signals, where the respective plurality of product term signals are compared to provide a comparison signal, and provide a product term signal of the plurality of product terms signals in response to the comparison signal;
(b) a summary term generator for providing a plurality of summary term signals in parallel, each summary term signal indicative of an OR combination of a combination of a corresponding product term signal from each product term generator; and
(c) a selection circuit that provides the plurality of output code signals according to an extreme of the respective magnitudes of the input codes, an output code signal being indicative of an AND combination of a multiplicity of summary term signals of the plurality of summary term signals; and
c. a resource comprising a controller that receives the output code signals and controls cooperation of the resource with the device associated with the input code corresponding to the extreme of the respective magnitudes of the input codes.

6. The computer system of claim 5 wherein the extreme is a maximum.

7. A method of determining an output code having a magnitude corresponding to an extreme magnitude of a plurality of input codes, each input code having a magnitude, the method comprising:
storing the plurality of input codes in a memory;
providing a multiplicity of input codes from the memory to an arithmetic-logic circuit, each input code conveyed on a plurality of input signal lines in parallel format, the arithmetic logic circuit comprising:
a. for each respective plurality of input code signals, a respective product term generator, each product term generator for providing a respective plurality of product term signals, each product term signal indicative of an AND combination of respective input code signals, where the respective plurality of product term signals are compared to provide a comparison signal, and provide a product term signal of the plurality of product terms signals in response to the comparison signal;
b. a summary term generator for providing a plurality of summary term signals in parallel, each summary term signal indicative of an OR combination of a corresponding product term signal from each product term generator; and
c. a selection circuit for providing the plurality of output code signals according to an extreme of the respective magnitudes of the input codes, an output code signal being indicative of an AND combination of a multiplicity of summary term signals of the plurality of summary term signals; and
obtaining the output code from the arithmetic-logic circuit by receiving the plurality of output code signals.

8. An arithmetic-logic circuit for receiving a plurality of input codes and for determining an output code, each code having a respective magnitude and being conveyed in parallel by a plurality of respective code signals, the circuit comprising:
a. for each respective plurality of input code signals, a means for providing a respective plurality of product term signals, each product term signal indicative of an AND combination of respective input code signals and a means for comparing the respective plurality of product term signals that provide a comparison signal, and that provide a product term signal of the plurality of product term signals in response to the comparison signal;

b. means for providing a plurality of summary term signals in parallel, each summary term signal indicative of an OR combination of a corresponding product term signal from each product term generator; and c. means for providing the plurality of output code signals according to an extreme of the respective magnitudes of the input codes, an output code signal being indicative of an AND combination of a multiplicity of summary term signals of the plurality of summary term signals.

9. The arithmetic-logic circuit of claim 8 wherein:

a. the means for providing the plurality of output code signals comprises a means for multiplexing that provides and output code signal of the plurality;

b. the means for multiplexing comprises a data input coupled to a first summary term signal of the multiplicity; and c. the means for multiplexing further comprises a selection input coupled to a second summary term signal.

10. The arithmetic-logic circuit of claim 8 wherein:

a. the particular means for providing a plurality of product term signals further comprises a register for providing in parallel a plurality of stored group code signals; and b. the means for comparing provides the comparison signal in response to the stored group code signals.

11. An arithmetic-logic circuit for receiving a plurality of input codes and for determining an output code, each code having a respective magnitude and being conveyed in parallel by a plurality of respective code signals, the circuit comprising:

a. for each respective plurality of input code signals, a means for providing a respective plurality of product term signals, each product term signal indicative of an AND combination of respective input code signals;

b. means for providing a plurality of summary term signals in parallel, each summary term signal indicative of an OR combination of a corresponding product term signal from each product term generator;

c. means for providing the plurality of output code signals according to an extreme of the respective magnitudes of the input codes, an output code signal being indicative of an AND combination of a multiplicity of summary term signals of the plurality of summary term signals, wherein for each respective means for providing a plurality of product term signals:

(1) a means for comparing that provides a respective comparison signal; and (2) a register for providing in parallel a respective plurality of stored group code signals;

d. each respective means for providing a plurality of product term signals provides the plurality of product term signals in further response to the respective comparison signal; and e. each respective means for comparing, being coupled to a common bus for receiving in parallel a plurality of group code signals, provides the respective comparison signal in response to comparing the respective stored group code signals and the plurality of group code signals.

12. The arithmetic-logic circuit of claim 11 further comprising a means for processing coupled to the bus for providing the plurality of group code signals.

13. The arithmetic-logic circuit of claim 12 further comprising a substrate on which the arithmetic-logic circuit is formed.

14. The arithmetic-logic circuit of claim 12 wherein the arithmetic-logic circuit further comprises a request logic circuit, responsive to a respective interrupt signal corresponding to each means for providing a plurality of product term signals, for providing an interrupt request signal to the means for processing.

15. The arithmetic-logic circuit of claim 14 wherein:

a. means for process provides an interrupt acknowledge signal in response to the interrupt request signal; and b. the mean for providing the plurality of output code signals provides the plurality of output code signals to the means for processing in response to the interrupt acknowledge signal.

16. An arithmetic-logic circuit for receiving a plurality of input codes and for determining an output code, each code having a respective magnitude and being conveyed in parallel by a plurality of respective code signals, the circuit comprising:

a. for each respective plurality of input code signals, a means for providing a respective plurality of product term signals, each product term signal indicative of an AND combination of respective input code signals;

b. means for providing a plurality of summary term signals in parallel, each summary term signal indicative of an OR combination of a corresponding product term signal from each product term generator; and c. means for providing the plurality of output code signals according to an extreme of the respective magnitudes of the input codes, an output code signal being indicative of an AND combination of a multiplicity of summary term signals of the plurality of summary term signals d. the arithmetic-logic circuit further comprises a request logic circuit for providing a first signal in response to a respective second signal corresponding to each means for providing a plurality of product term signals; and e. the means for providing the plurality of output code signals provides the plurality of output code signals in further response to the second signal.

17. The arithmetic-logic circuit of claim 16 wherein the arithmetic-logic circuit provides the first signal in response to receiving an interrupt acknowledge signal from a provided means for processing.

18. The arithmetic-logic circuit of claim 16 wherein the arithmetic-logic circuit provides the first signal in response to receiving a bus access acknowledge signal from a provided means for controlling a bus.

19. A printer comprising:

a. a means for printing data on media, the means for printing in operation providing a plurality of pending interrupt request signals;

b. a means for controlling the means for printing, the means for controlling comprising:

(1) a means for processing that provides data to the means for printing in accordance with an output code received in parallel by a plurality of output code signals; and (2) a means for controlling interrupts comprising:

(a) for each pending interrupt request signal:

1) a respective register for storing an input code and for providing a respective multiplicity of input code signals in parallel to convey the respective input code;

2) a respective means for providing a plurality of product term signals coupled to the respective register, each product term signal indicative of and AND combination of respective input code signals; and 3) means for comparing the respective plurality of product term signals that provide a comparison signal, and that provide a product term signal of the plurality of product term signals in response to the comparison signal;

(b) a means for providing a plurality of summary term signals in parallel, each summary term signal indicative of an OR combination of a corresponding product term signal from each means for providing a plurality of product term signals; and (c) a means for providing the plurality of output code signals, the output code conveying an extreme of the input codes associated with the pending interrupt request signals.

20. The printer of claim 19 wherein the means for processing is coupled to each respective register for storing the respective input code value for each interrupt request.

21. The printer of claim 19 wherein the means for controlling the means for printing is formed on one integrated circuit substrate.

22. An apparatus comprising:

a. a plurality of devices, each device providing a respective device signal;

b. a means for arbitrating comprising:

(1) a respective input code register that stores in input code having a magnitude, each register providing, in response to the corresponding device signal, a respective plurality of input code signals in accordance with the respective stored input code, each input code associated with a device of the plurality of devices; and (2) a means for selecting an item value comprising:

(a) for each respective plurality of input code signals, a respective means for providing a plurality of product term signals, each product term signal indicative of and AND combination of respective input code signals;

(b) means for comparing the respective plurality of product term signals that provide a comparison signal, and that provide a product term signal of the plurality of product term signals in response to the comparison signal;

(c) a means for providing a plurality of summary term signals in parallel, each summary term signal indicative of an OR combination of a corresponding product term signal from each means for providing a plurality of product term signals; and (d) a means for providing the plurality of output code signals that provides the plurality of output code signals according to an extreme of the respective magnitudes of the input codes, an output code signal being indicative of an AND combination of multiplicity of summary term signals of the plurality of summary term signals; and c. a resource comprising a controller that receives the output code signals and controls cooperation of the resource with the device associated with the input code corresponding to the extreme of the respective magnitudes of the input codes.

23. The apparatus of claim 22 wherein the extreme is a maximum.

24. The apparatus of claim 22 wherein the resource comprises at least one of a bus, a data storage device, a port on a data storage device, an instrument, a controller, an analyzer, a recorder, a display, a network communication device, a computer, a processor, and a computer peripheral.

25. The apparatus of claim 22 in operative combination with at least one of a general purpose computer system, a special purpose computer system, a computer system peripheral, a processor, a memory device, a bus arbitration device, a network communication device, a data storage device, a printer, a display, an input device, an instrument, an embedded digital circuit, a signal switching device, a process control device, a system management device, and an application specific integrated circuit.

* * * * *